US012708848B2

(12) United States Patent
Sekigawa et al.

(10) Patent No.: US 12,708,848 B2
(45) Date of Patent: Aug. 18, 2026

(54) ONE OR MORE COMPUTER-READABLE NON-TRANSITORY STORAGE MEDIA HAVING STORED THEREIN GAME PROGRAM, GAME SYSTEM, GAME PROCESSING METHOD, AND GAME APPARATUS

(71) Applicant: Nintendo Co., Ltd., Kyoto (JP)

(72) Inventors: Yoshito Sekigawa, Kyoto (JP); Kaoru Kita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 216 days.

(21) Appl. No.: 18/784,361

(22) Filed: Jul. 25, 2024

(65) Prior Publication Data

US 2025/0128160 A1 Apr. 24, 2025

(30) Foreign Application Priority Data

Oct. 19, 2023 (JP) ................................ 2023-180437

(51) Int. Cl.

*A63F 13/54* (2014.01)
*A63F 13/52* (2014.01)
*A63F 13/55* (2014.01)
*H04S 1/00* (2006.01)
*H04S 7/00* (2006.01)

(52) U.S. Cl.

CPC .............. *A63F 13/54* (2014.09); *A63F 13/52* (2014.09); *A63F 13/55* (2014.09); *H04S 1/007* (2013.01); *H04S 7/303* (2013.01); *H04S 2400/11* (2013.01)

(58) Field of Classification Search

None

See application file for complete search history.

(56) References Cited

U.S. PATENT DOCUMENTS

| | | | | |
|---|---|---|---|---|
| 2003/0104864 | A1 * | 6/2003 | Kawagoe ............ | A63F 13/5258 463/33 |
| 2004/0214638 | A1 * | 10/2004 | Totaka ................. | G10H 1/0025 463/35 |
| 2012/0315988 | A1 | 12/2012 | Tsuchida et al. | |
| 2022/0295208 | A1 | 9/2022 | Taniwa | |

FOREIGN PATENT DOCUMENTS

| | | | | |
|---|---|---|---|---|
| CN | 115373626 | | 11/2022 | |
| JP | 2012-257144 | | 12/2012 | |
| JP | 2017-138277 | | 8/2017 | |
| JP | 2018-139343 | | 9/2018 | |
| JP | 2020-014534 | | 1/2020 | |
| JP | 2020177184 | A * | 10/2020 | ............. A63F 13/54 |
| JP | 2022-100777 | | 7/2022 | |
| JP | 2022100777 | A | 7/2022 | |
| JP | 2022-141054 | | 9/2022 | |

* cited by examiner

*Primary Examiner* — Jason T Yen

(74) *Attorney, Agent, or Firm* — Nixon & Vanderhye PC

(57) ABSTRACT

A predetermined character is controlled in a virtual space; in a first scene, a first BGM sound based on a stereo sound source for BGM is outputted in stereo; and in a second scene where the predetermined character is positioned on a far side in the virtual space, a second BGM sound according to a sound in which, on the basis of the stereo sound source for BGM, a stereo component is decreased and a monaural component is increased with respect to a sound of the stereo sound source, is outputted in stereo.

28 Claims, 8 Drawing Sheets

F I G. 10
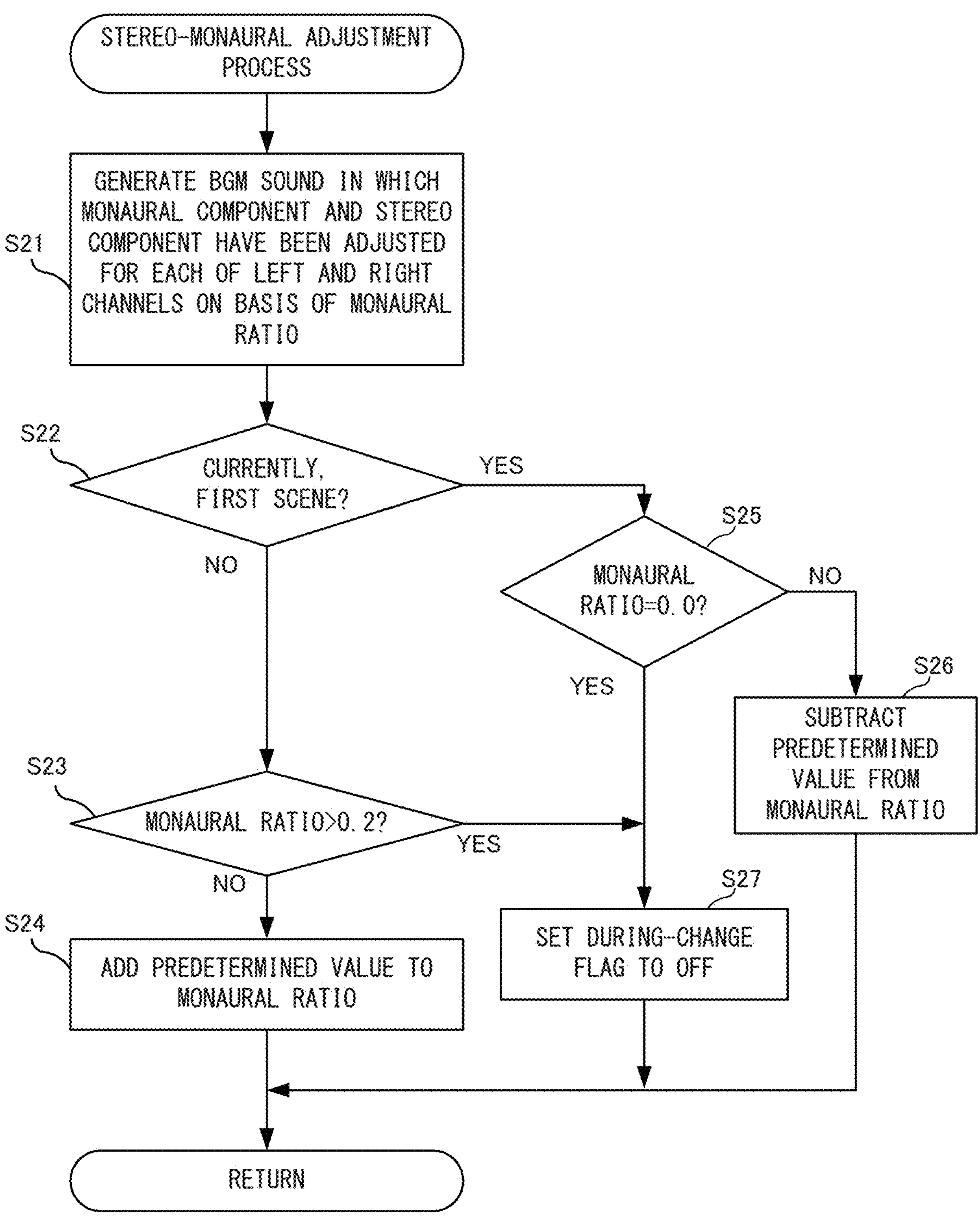

ONE OR MORE COMPUTER-READABLE NON-TRANSITORY STORAGE MEDIA HAVING STORED THEREIN GAME PROGRAM, GAME SYSTEM, GAME PROCESSING METHOD, AND GAME APPARATUS

CROSS REFERENCE TO RELATED APPLICATION

This application claims priority to Japanese Patent Application No. 2023-180437 filed on Oct. 19, 2023, the entire contents of which are incorporated herein by reference.

FIELD

The present disclosure relates to sound control processing of outputting BGM based on a stereo sound source to a speaker.

BACKGROUND AND SUMMARY

To date, a technology of correcting the volume of a sound reproduced in a game, in accordance with the distance in the height direction between a predetermined character and a predetermined object in a virtual space, has been known.

In the above technology, if the distance between the predetermined character and the predetermined object is large, correction of reducing the volume of the sound reproduced in the game is performed. Therefore, there is a case where the volume becomes low, making it difficult to hear the sound.

In view of the above, the following configuration examples are provided, for example.

Configuration 1

Configuration 1 is one or more computer-readable non-transitory storage media having stored therein a game program, the game program causing at least one processor of an information processing apparatus to: control a predetermined character in a virtual space; in a first scene, output in stereo a first BGM sound based on a stereo sound source for BGM; and in a second scene where the predetermined character is positioned on a far side in the virtual space, output in stereo a second BGM sound according to a sound in which, on the basis of the stereo sound source for BGM, a stereo component is decreased and a monaural component is increased with respect to a sound of the stereo sound source.

According to the above configuration example, if the predetermined character is on the far side, the BGM is made into a sound closer to being monaural from stereo, to be outputted. Accordingly, the sense of depth can be expressed by the BGM.

Configuration 2

According to Configuration 2, in Configuration 1 above, the first scene may be a scene where the predetermined character is in a first range on a near side in the virtual space, and the second scene may be a scene where the predetermined character is in a second range on the far side in the virtual space. The game program may further cause the processor to move the predetermined character to the second range if a first condition has been satisfied in the first scene.

According to the above configuration example, as the predetermined character is moved to the far side, the BGM is changed to a sound closer to being monaural. Therefore, it is possible to allow the player to perceive a sensation that the predetermined character has moved to the far side.

Configuration 3

According to Configuration 3, in Configuration 2 above, the game program may further cause the processor to move the predetermined character to the first range if a second condition has been satisfied in the second scene.

According to the above configuration example, if the predetermined character having moved to the second range (far side) has returned to the first range (near side), the BGM having been made closer to being monaural is restored to the original. Accordingly, occurrence of movement between the far side and the near side can be expressed through reproduction control of the BGM.

Configuration 4

According to Configuration 4, in Configuration 1 above, the game program may cause the processor to determine, in the second scene, on the basis of a depth value of the predetermined character, a degree by which the stereo component is decreased and the monaural component is increased with respect to the sound of the stereo sound source.

According to the above configuration example, the farther the predetermined character is on the far side, the more the BGM can be made into a sound closer to being monaural. Accordingly, the sense of depth can be expressed by the BGM that changes in association with movement of the predetermined character.

Configuration 5

According to Configuration 5, in Configuration 1 above, the game program may cause the processor to, in the second scene, generate the second BGM sound by using: a sound obtained by combining, at a first proportion, a first sound of the stereo sound source for BGM with a second sound of the stereo sound source for BGM; and a sound obtained by combining, at the first proportion, the second sound with the first sound, and output the second BGM sound in stereo.

Configuration 6

According to Configuration 6, in Configuration 5 above, the game program may further cause the processor to, in the second scene, generate the second BGM sound by reducing, at an attenuation rate calculated on the basis of the first proportion, a volume of each of: a sound obtained by adding, at the first proportion, the first sound of the stereo sound source for BGM to the second sound; and a sound obtained by adding, at the first proportion, the second sound to the first sound.

According to the above configuration example, the volume of the second BGM can be outputted at an appropriate level.

Configuration 7

According to Configuration 7, in any of Configuration 1 to Configuration 6 above, the predetermined character may be a player character. The game program may cause the processor to control movement of the player character on the basis of an operation input.

According to the above configuration example, it is possible to allow the player to grasp in an auditory manner whether the player character is positioned on the far side or positioned on the near side.

According to the present disclosure, if the predetermined character is on the far side, the BGM is made closer to being monaural from stereo, whereby the sense of depth can be expressed by the BGM.

BRIEF DESCRIPTION OF THE DRAWINGS

FIG. 10 is a flowchart showing a non-limiting example of details of a stereo-monaural adjustment process.

DETAILED DESCRIPTION OF NON-LIMITING EXAMPLE EMBODIMENTS

Hereinafter, an exemplary embodiment will be described.

[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. In addition, the information processing according to the exemplary embodiment can also be applied to an information processing system that includes the above game apparatus or the like and a predetermined server. In the exemplary embodiment, a stationary game apparatus (hereinafter, referred to simply as a game apparatus) will be described as an example of the information processing apparatus. In addition, game processing will be described as an example of the information processing.

Figure 1:
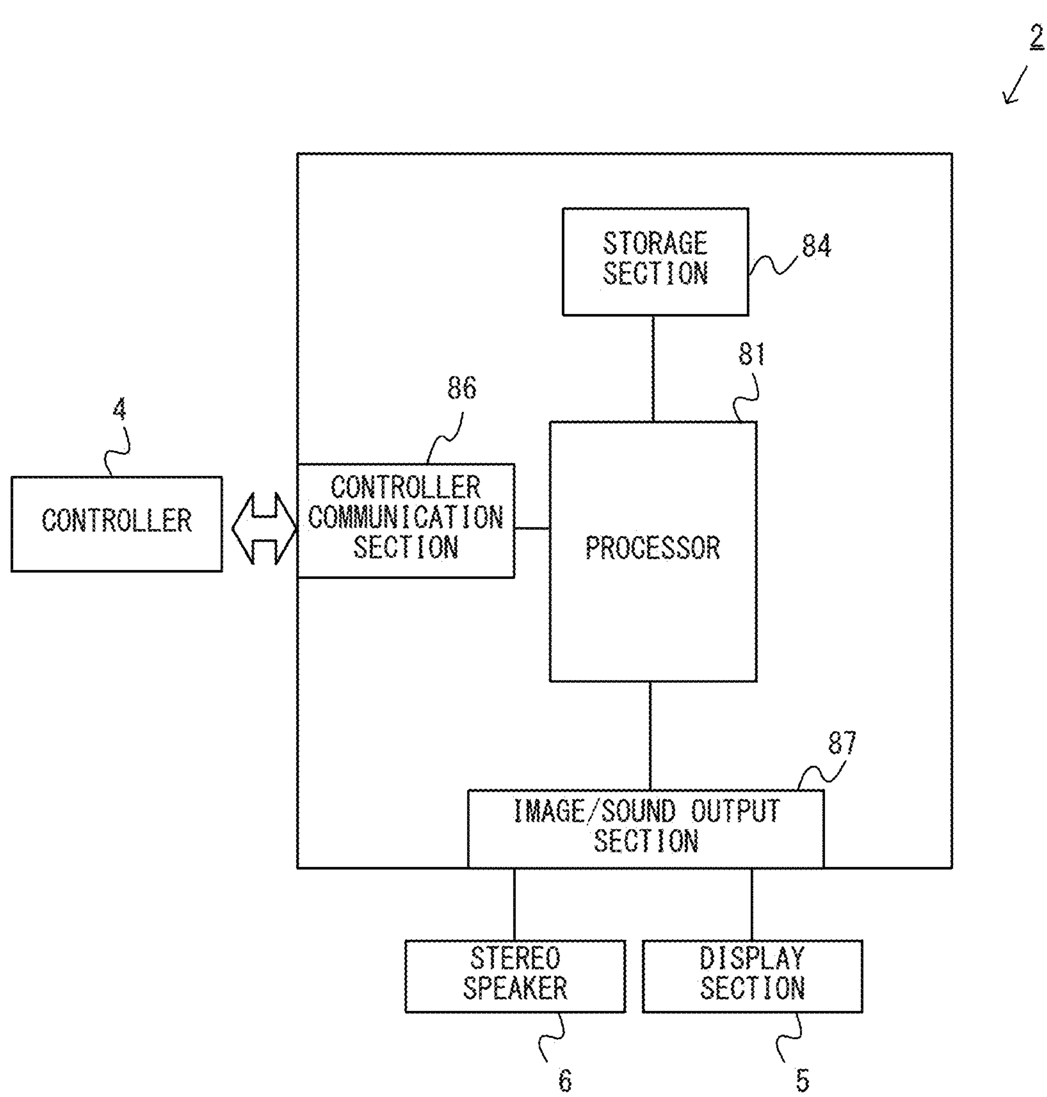
FIG. 1 is a block diagram showing a non-limiting example of an internal configuration of a game apparatus 2.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the game apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like. The game apparatus 2 also includes a controller communication section 86 for the game apparatus 2 to perform wired or wireless communication with a controller 4. Although not shown, the controller 4 is provided with various buttons such as a cross key and A, B, X, and Y buttons, an analog stick, etc.

Moreover, a display section 5 (for example, a liquid crystal monitor, or the like) and a stereo speaker 6 are connected to the game apparatus 2 via an image/sound output section 87. The processor 81 outputs an image generated (for example, by executing the above information processing) to the display section 5 via the image/sound output section 87. In addition, the processor 81 outputs a generated sound (signal) to the stereo speaker 6 via the image/sound output section 87.

[Outline of Game Processing in Exemplary Embodiment]

Figure 2:
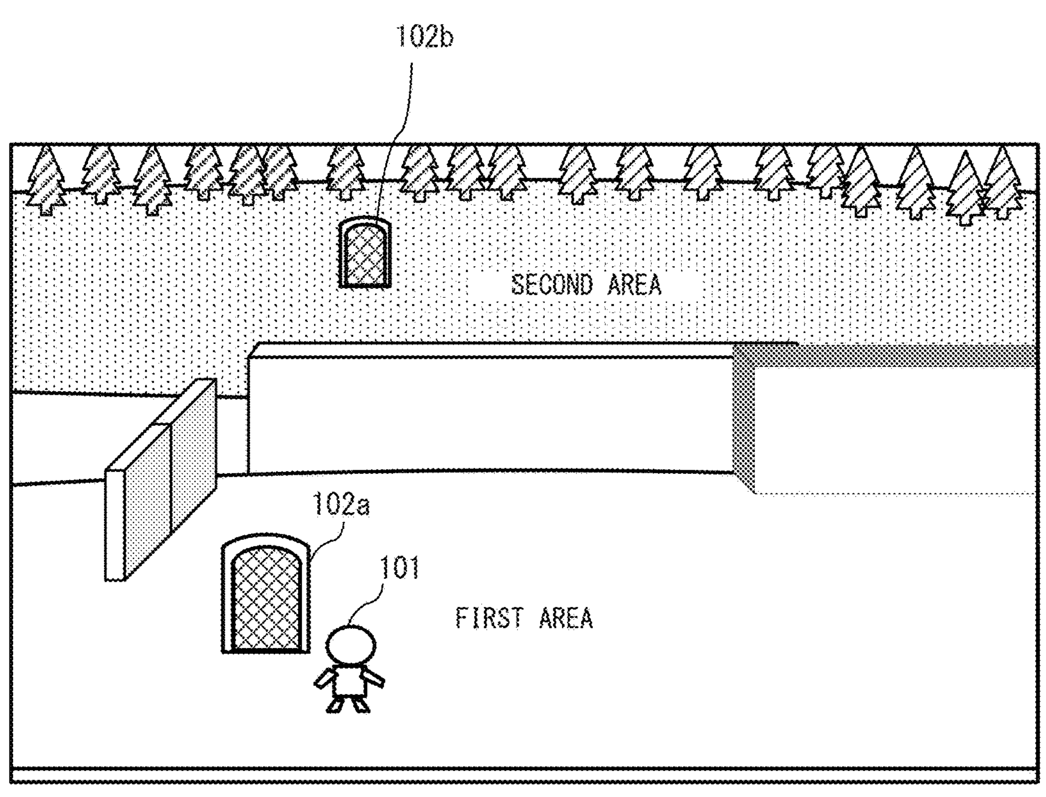
FIG. 2 is a non-limiting example of a game screen according to an exemplary embodiment.

Next, the outline of operation in game processing executed by the game apparatus 2 according to the exemplary embodiment will be described. First, a game assumed in the exemplary embodiment is a game in which a player character object (hereinafter, referred to as player character) is operated in a virtual three-dimensional game space (hereinafter, referred to as virtual game space). FIG. 2 shows an example of a game screen in this game. FIG. 2 shows a virtual space including a first area and a second area. In addition, FIG. 2 shows a player character 101 in the first area. Further, a gate object 102*a* is shown in the first area and a gate object 102*b* is shown in the second area (hereinafter, the gate object 102*a* and the gate object 102*b* may be collectively referred to as gate). Although not shown, in this game, BGM based on a stereo sound source is also reproduced.

Figure 3:
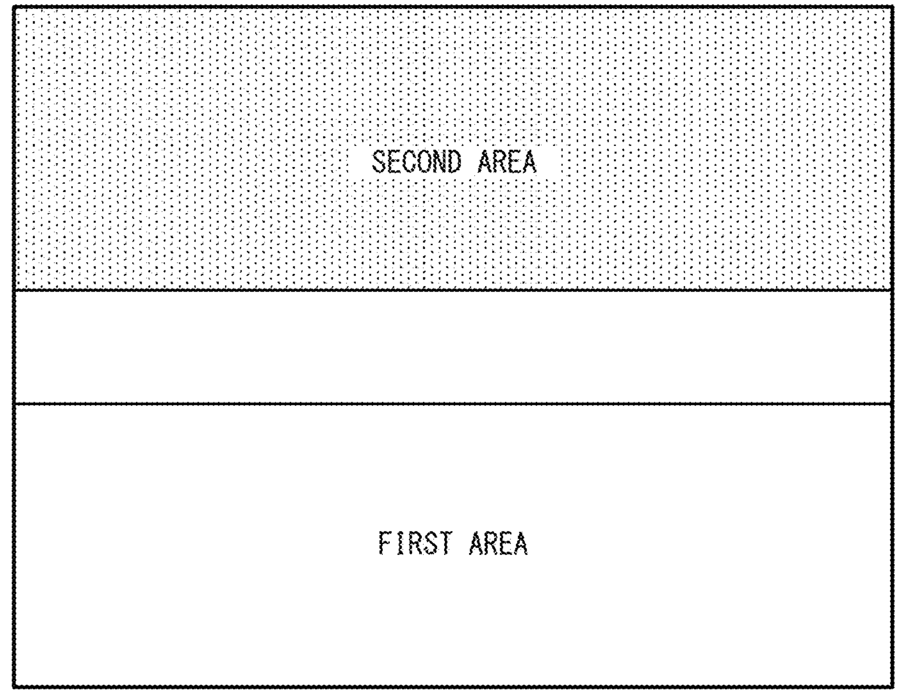
FIG. 3 is a schematic diagram showing a non-limiting example of an overview of a virtual space.
Figure 4:
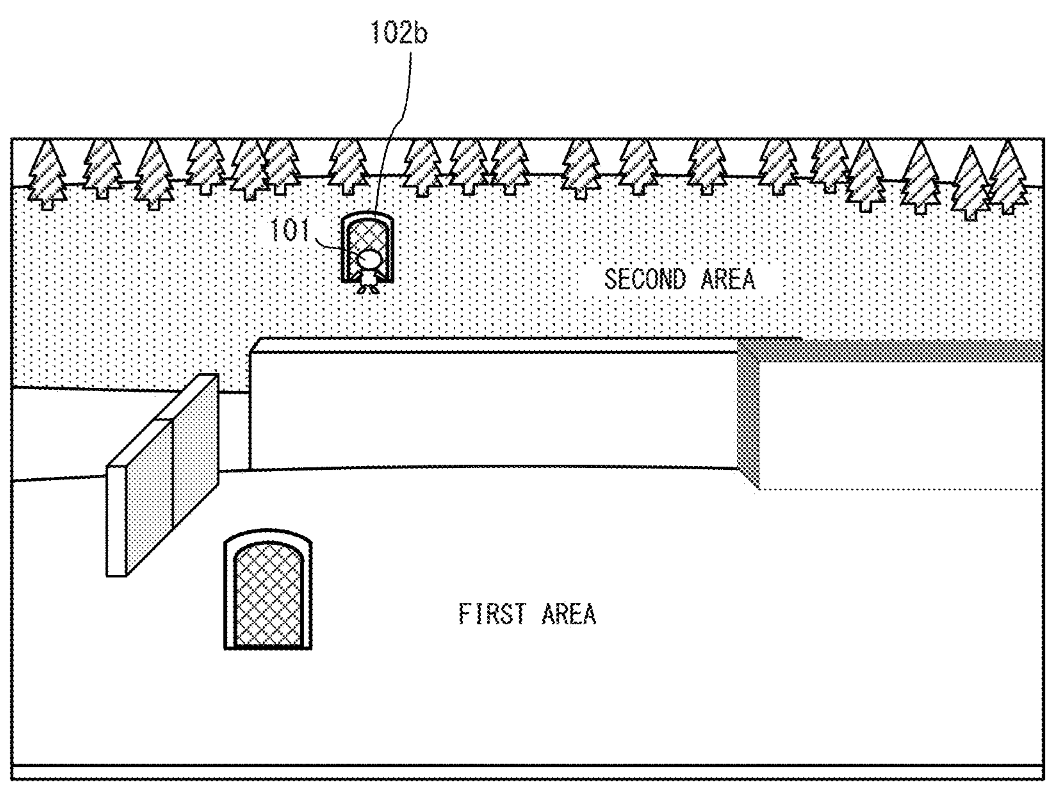
FIG. 4 is a non-limiting example of a game screen according to the exemplary embodiment.

Here, in this game, it is assumed that the first area and the second area above are not continuous to each other at the ground and are topographically divided. FIG. 3 shows a schematic diagram of an overview of the virtual space of this game. As shown in FIG. 3, the first area and the second area are configured so as not to be continuous to each other at the ground. In this game, a gate 102 is used in order to allow movement between the first area and the second area. Specifically, if the player character 101 is brought into contact with the gate 102*a* arranged in the first area, the player character 101 can be moved to the side of the gate 102*b* arranged in the second area, as shown in FIG. 4. Conversely, if the player character 101 is brought into contact with the gate 102*b* while the player character 101 is in the second area, the player character 101 can be moved to the side of the gate 102*a*. In other words, in this game, by causing the player character 101 to pass through the gate 102, the player character 101 is teleported to a certain position where the gate 102 is in the other area.

In the description below, the situation where the player character 101 is in the first area will be referred to as a "first scene". The situation where the player character 101 is in the second area will be referred to as a "second scene".

Meanwhile, in this game, during the game, BGM based on the stereo sound source is reproduced as described above. Then, in the exemplary embodiment, the way of reproducing this BGM is devised, thereby performing a process of allowing a player to feel the sense of depth of the virtual space, by merely performing reproduction of the BGM.

Figure 5:
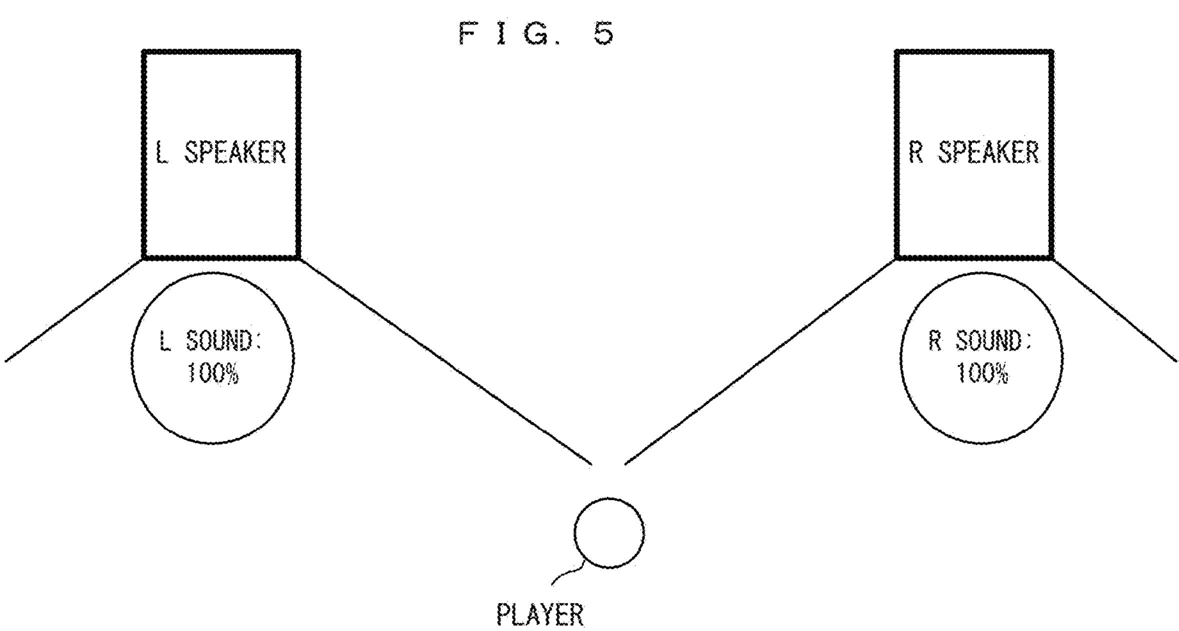
FIG. 5 illustrates a non-limiting example of a principle of a process according to the exemplary embodiment.

Hereinafter, the outline of the processing and the principle of the processing in the exemplary embodiment will be described. In the exemplary embodiment, different control is performed between the BGM reproduction control in the above first scene and the BGM reproduction control in the above second scene, whereby the sense of depth is expressed. In the exemplary embodiment, as the different control, if the "near side" of the virtual space is to be expressed, control of reproducing the BGM as a stereo sound is performed, and if the "far side" of the virtual space is to be expressed, control of reproducing the BGM by making the sound closer to being monaural is performed. Specifically, in the above first scene, the BGM based on the stereo sound source is reproduced as is. "Reproduce as is" refers to, as shown in FIG. 5, outputting a sound (hereinafter, referred to as an L sound) based on sound data for a left channel included in the stereo sound source at 100% volume from a left speaker (L speaker), and outputting a sound (hereinafter, referred to as an R sound) based on sound data for a right channel at 100% volume from a right speaker (R speaker). In the following, BGM in the first scene will be referred to as a "first BGM sound". In addition, a BGM sound that is outputted in the second scene as described later will be referred to as a "second BGM sound". In the game processing, a sound obtained by adding an audio effect such as reverberation or echo to the above BGM may be outputted as the first BGM sound or the second BGM sound.

Figure 6:
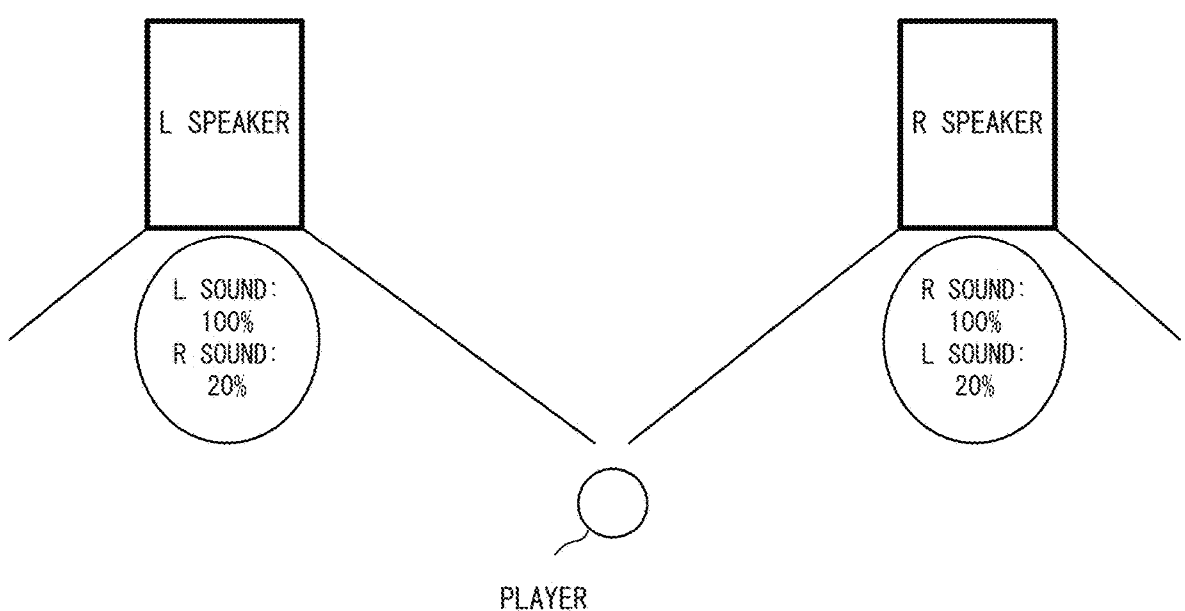
FIG. 6 illustrates a non-limiting example of a principle of a process according to the exemplary embodiment.
Figure 7:
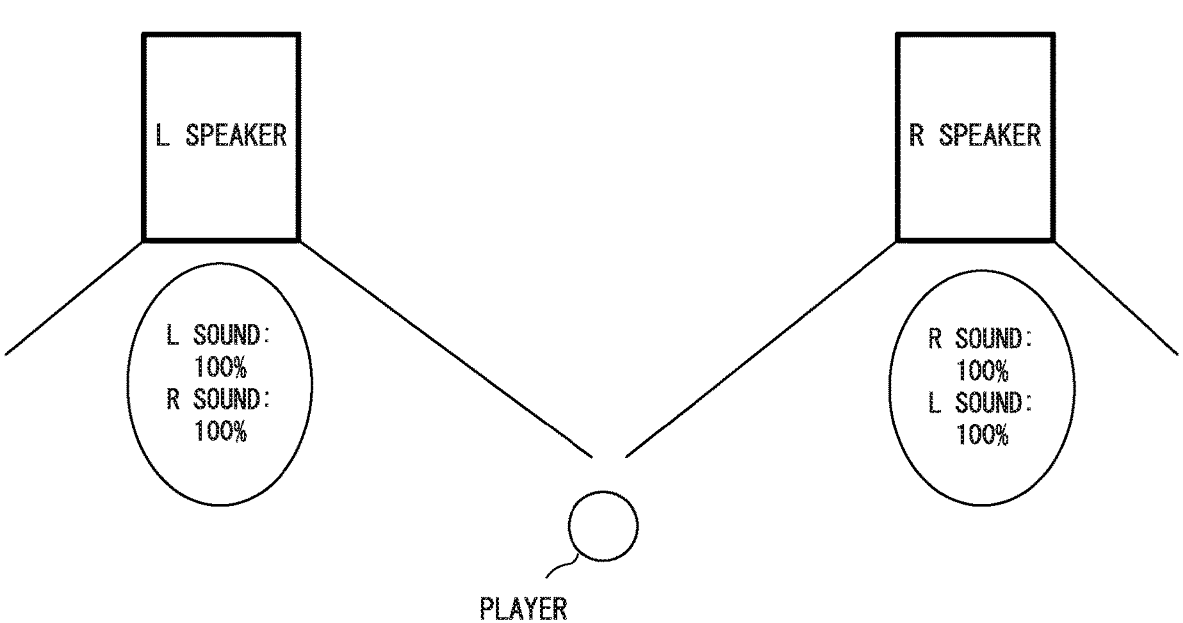
FIG. 7 illustrates a non-limiting example of a principle of a process according to the exemplary embodiment.

Meanwhile, in the second scene, a sound in which a stereo component is decreased and a monaural component is increased with respect to the sound of the stereo sound source is outputted in stereo as the second BGM sound. Specifically, in the exemplary embodiment, this is realized by mixing the sounds for the respective left and right channels to be outputted from the respective left and right speakers, with a sound for the other channel and outputting the resultant sounds. In an example, as shown in FIG. 6, from the L speaker, a sound obtained by combining the R sound at 20% volume with the L sound at 100% volume is outputted. From the R speaker, a sound obtained by combining the L sound at 20% volume with the R sound at 100% volume is outputted. This is based on the viewpoint that, as for a stereo sound heard from a nearby stereo sound source, the sense of stereo is more clearly perceived, whereas as for a stereo sound heard from a far stereo sound source, the sense of stereo is weakened. That is, with respect to a sound heard from a far stereo sound source, the difference between sounds entering the left and right ears is reduced, and the sense of stereo is weakened, whereby the way the sound is heard becomes close to that in the case where a monaural sound is heard. Therefore, assuming that the positional relationship between the player and the left and right speakers does not change, in the case where the sound output control as in FIG. 5 is performed, there is a clear difference between the sounds heard from left and right, and thus, it is considered that the player can perceive the sense of stereo. Meanwhile, for example, as shown in FIG. 7, a case where the sounds of the left and right speakers are respectively added with a sound of the other channel at 100% volume, and the resultant sounds are outputted, is assumed. In this case, consequently, the sounds heard from left and right are the same sounds. In other words, since there is no difference between the sounds heard from left and right, the way of hearing these sounds can be equivalent to that in the case of hearing a monaural sound (the output control itself is the control for outputting in stereo). That is, if the sounds of the channels of the respective left and right speakers are added with the sound of other channel, sounds in which the stereo component is decreased and the monaural component is increased can be realized. On the basis of this viewpoint, in the exemplary embodiment, in the first scene where the player character 101 is present on the nearer side (virtual camera side), the BGM of the stereo sound source is reproduced as is. Meanwhile, in the second scene where the player character 101 is on the far side, outputs of the respective left and right channels are added with the sound of the other channel, whereby the BGM is changed to a sound closer to being monaural and reproduced. Accordingly, in the second scene, an impression that the BGM is heard from farther away can be provided to the player, whereby a sensation that the player character 101 has moved to the far side can be provided. In other words, the sense of depth of the virtual space can be expressed through change in the way of hearing (the way of providing) the BGM.

In the description below, the degree by which the stereo component is decreased and the monaural component is increased as described above will be referred to as a "monaural ratio". In the exemplary embodiment, the monaural ratio is indicated as a value in a range of 0.0 to 1.0. If the monaural ratio is 0.0, as shown in FIG. 5, a state where the sounds of the respective channels are not added with the sound of the other channel is established (a normal stereo sound state). If the monaural ratio is 1.0, as in FIG. 7, a state where the sounds of the respective channels are added with the sound of the other channel at a 100% proportion and outputted is established (a state where the sounds are substantially monaural sounds). For example, if the monaural ratio is 0.2, as in FIG. 6, a state where the respective left and right output sounds are added with the sound of the other channel by 20% is established.

In the exemplary embodiment, an example case where the upper limit of the monaural ratio in the second scene is set to be 0.2 will be described. It is understood that this is an example, and in another exemplary embodiment, the upper limit of the monaural ratio in the second scene may be set to 1.0. In the exemplary embodiment, control in which the monaural ratio is not instantaneously reflected simultaneously with movement from the first area to the second area through the gate 102, and the monaural ratio is gradually increased over some time up to the upper limit value is also performed. This also applies to the case where the monaural ratio is decreased in association with movement from the second area to the first area. In another exemplary embodiment, the monaural ratio may be instantaneously reflected.

Here, it is conceivable that merely adding the output sounds of the left and right speakers with the sound of the other channel and outputting the resultant sounds as described above may result in increase in the overall volume. Therefore, in the exemplary embodiment, adjustment of the volume of the sound to be finally outputted is also performed (details will be described later).

[Details of Game Processing of Exemplary Embodiment]

Figure 8:
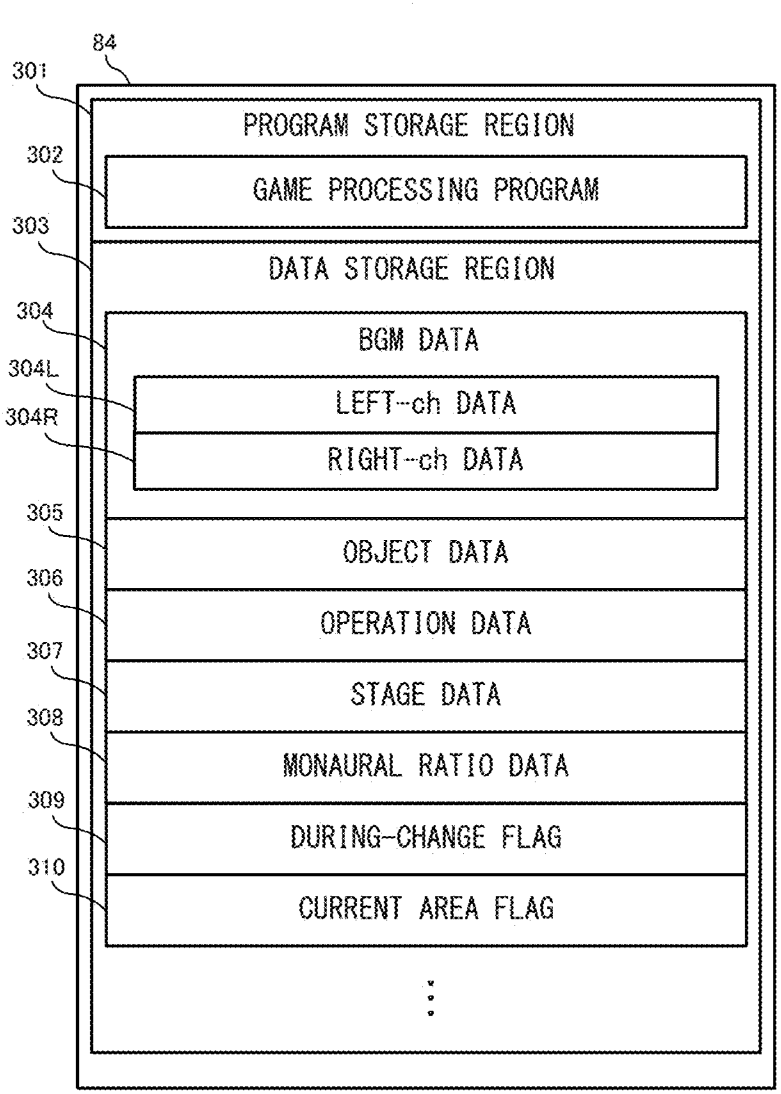
FIG. 8 is a memory map showing a non-limiting example of various types of data stored in a storage section 84.

Next, with reference to FIG. 8 to FIG. 10, the game processing in the exemplary embodiment will be described in more detail.

[Data to be Used]

First, various types of data to be used in this game processing will be described. FIG. 8 is a memory map showing an example of various types of data stored in the storage section 84 of the game apparatus 2. The storage section 84 includes a program storage region 301 and a data storage region 303. In the program storage region 301, a game processing program 302 is stored. In the data storage region 303, BGM data 304, object data 305, operation data 306, stage data 307, monaural ratio data 308, a during-change flag 309, a current area flag 310, and the like are stored.

The game processing program 302 is a program for executing the game processing according to the exemplary embodiment, and also includes a program code for executing output control of BGM as described above.

The BGM data 304 is data of the BGM of the stereo sound source described above. Therefore, the BGM data 304 includes left-ch data 304L being the sound data for the left channel, and right-ch data 304R being the sound data for the right channel.

The object data 305 is data regarding various objects that appear in the game. The object data 305 also includes the player character 101 and data of the gate 102.

The operation data 306 is data indicating the content of an operation performed on the controller 4. In the exemplary embodiment, data indicating a press state of a button such as a cross key and an input state of an analog stick provided to the controller 4 is included. The content of the operation data 306 is updated in a predetermined cycle on the basis of a signal from the controller 4.

The stage data 307 is data that defines a configuration of the virtual space to serve as the stage of the game. Information indicating the topography and an arrangement relationship of the first area and the second area, and information indicating the arrangement position of various objects such as the gate 102 are included.

The monaural ratio data 308 is data indicating the monaural ratio currently set. In this example, the monaural ratio data 308 is a value in a range of 0.0 to 1.0, and 0.0 is set as the initial value.

The during-change flag 309 is a flag for indicating whether or not it is immediately after the player character 101 has moved to the other area by using the gate 102. In the exemplary embodiment, as described above, when the player character 101 has moved to the other area by using the gate 102, the monaural ratio is gradually changed, whereby the sense of stereo of the BGM is changed. The during-change flag 309 can be said to be a flag indicating whether or not it is a period in which the monaural ratio is changed until the upper limit value (0.2 in this example) or the lower limit value (0.0) is reached after the player character 101 has moved to the other area.

The current area flag 310 is a flag for indicating whether the player character 101 is in the first area or the second area. That is, the current area flag 310 is a flag for discriminating whether the current situation is the first scene or the second scene. In the exemplary embodiment, the current area flag 310 being OFF indicates the first scene, and the current area flag 310 being ON indicates the second scene.

Other than this, in the storage section 84, various types of data that is used in the game processing are stored as necessary.

[Detail of the Process Executed by Processor 81]

Next, details of the game processing according to the exemplary embodiment will be described. Here, a process regarding control of the BGM as above will be mainly described, and detailed description of the other game processing is omitted.

Figure 9:
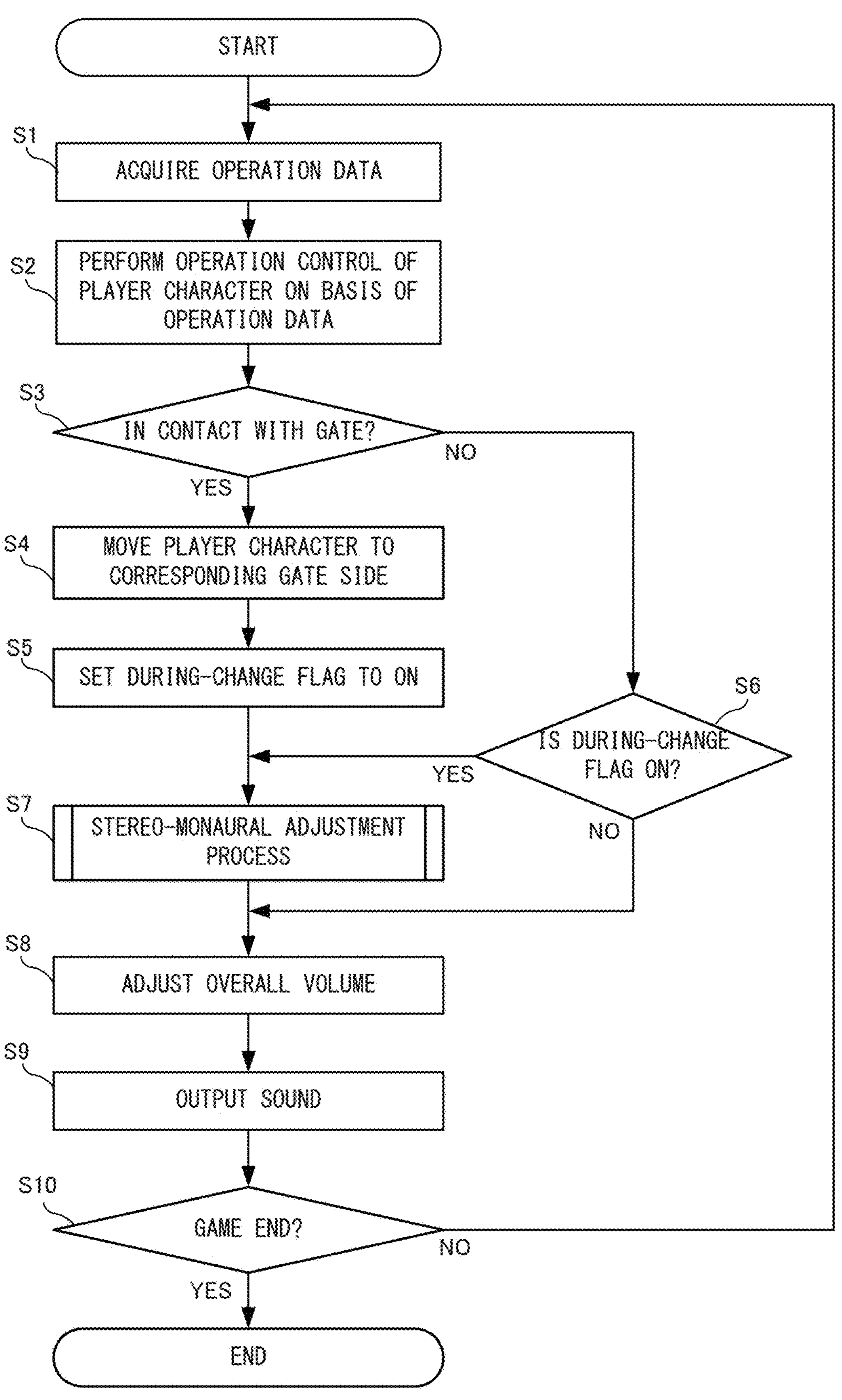
FIG. 9 is a flowchart showing a non-limiting example of details of game processing according to the exemplary embodiment.

FIG. 9 is a flowchart showing details of the game processing according to the exemplary embodiment. In the exemplary embodiment, one or more processors read the above program stored in one or more memories and execute the program, whereby the flowchart is realized. The process loop from step S1 to S10 shown in FIG. 9 is repeatedly executed for each frame. The flowchart is merely an example of the processing procedure. Therefore, as long as the same results are obtained, the processing order of the steps may be interchanged. The value of variables and the thresholds used in determination steps are also merely examples, and other values may be adopted as necessary.

Upon start of the game processing according to the exemplary embodiment, first, in step S1, the processor 81 acquires the operation data 306. Next, in step S2, the processor 81 performs operation control of the player character 101 on the basis of the content of the operation. Accordingly, the position of the player character 101 can be changed.

Next, in step S3, the processor 81 determines whether or not the player character 101 has come into contact with either of the gates 102. As a result of the determination, if the player character 101 has come into contact with a gate 102 (YES in step S3), the processor 81 moves, in step S4, the player character 101 to a position on the side of the other gate 102 associated with the gate to which the player character 101 has come into contact with. At this time, for example, a representation in which an animation of the player character 101 passing through the gate 102 is displayed such that the player character 101 moves is also performed.

Next, in step S5, the processor 81 sets the during-change flag 309 to ON.

Next, in step S7, the processor 81 executes a stereo-monaural adjustment process. FIG. 10 is a flowchart showing details of the process. First, in step S21, the processor 81 generates, for each of the left and right channels, a sound in which the monaural component and the stereo component have been adjusted on the basis of the BGM data 304 and the monaural ratio data 308. That is, the processor 81 combines a sound at 100% volume of each of the left and right channels with a sound obtained by causing the sound of the other channel to be at a volume based on the monaural ratio data 308. For example, if the monaural ratio data 308 is 0.0, the sound of the other channel is 0%, and thus, as a result, only sounds that are the sounds for the respective left and right channels at 100% volume are generated. That is, the monaural component is not increased, and sounds each adjusted so as to have only the stereo component (see FIG. 5) are generated. If the monaural ratio data 308 is, for example, 0.1, a sound obtained by combining a sound at 100% volume outputted from each channel with a sound obtained by causing the sound data of the other channel to be at 10% volume is generated. If the monaural ratio data 308 is, for example, 0.2, as shown in FIG. 6, a sound obtained by combining a sound at 100% volume outputted from each channel with a sound obtained by causing the sound of the other channel to be at 20% volume is generated.

Next, in step S22, the processor 81 determines, on the basis of the current area flag 310, whether or not the state is a state where the player character 101 is in the first area (the first scene). As a result of the determination, if the state is a state where the player character 101 is not in the first area (NO in step S22), it is considered that the current state is the second scene and is a state immediately after the player character 101 has moved from the first area to the second area. In this case, a process for gradually changing the BGM so as to be closer to being monaural is performed. First, in step S23, the processor 81 determines whether or not the current monaural ratio indicated by the monaural ratio data 308 has exceeded the upper limit value (0.2 in this example). As a result of the determination, if the monaural ratio has exceeded the upper limit value (YES in step S23), the processor 81 sets the during-change flag 309 to OFF in step S27. Meanwhile, if the monaural ratio has not exceeded the upper limit value yet (NO in step S23), the processor 81 adds a predetermined value (e.g., 0.01) to the monaural ratio data 308 in step S24. Then, the processor 81 ends the stereo-monaural adjustment process.

Meanwhile, as a result of the determination in step S22, if the state is a state where the player character 101 is in the first area (YES in step S22), it is considered that the state is a state immediately after the player character 101 has moved from the second area to the first area. In this case, a process for gradually restoring the BGM adjusted to be closer to being monaural, to the original is performed. First, in step S25, the processor 81 determines whether or not the current monaural ratio indicated by the monaural ratio data 308 has reached the lower limit value (0.0 in this example). As a result of the determination, if the current monaural ratio has reached the lower limit value (YES in step S25), the processor 81 sets the during-change flag 309 to OFF in step S27. Meanwhile, if the current monaural ratio has not reached the lower limit value yet (NO in step S25), the processor 81 subtracts a predetermined value (e.g., 0.01) from the monaural ratio data 308 in step S26. Then, the processor 81 ends the stereo-monaural adjustment process.

With reference back to FIG. 9, next, in step S8, the processor 81 performs adjustment of the overall volume. In the above adjustment process, if the sound of the other channel has been added, the overall sound becomes loud, and thus, in this process, a process of decreasing the overall volume is performed. Specifically, the processor 81 calculates an attenuation rate of the volume by using the formula below.

$$\text{Attenuation rate} = \cos(\text{monaural ratio} \times 60^\circ) \qquad \text{Formula 1}$$

Then, the processor 81 multiplies the volume of the sound of each channel combined through the above adjustment process, by the calculated attenuation rate, to determine the final output volume. For example, if the monaural ratio data 308 is 0.2, the attenuation rate is calculated to be 0.98. Then, the volume of the sound combined at 100% volume of the original channel+20% volume of the other channel as shown in FIG. 6 is multiplied by the attenuation rate, to reduce the volume that has been increased. Since cos 60° is ½, the above formula calculates an attenuation rate that decreases the volume obtained through addition in the above adjustment process to half the volume at maximum (if the monaural ratio is 1.0). In other words, in accordance with the monaural ratio, a volume multiplying factor is determined between 1.0 times to 0.5 times. Regarding this point, in another exemplary embodiment, instead of using the above formula, a formula by which the above monaural ratio (0.0 to 1.0) and a volume multiplying factor (1.0 to 0.5) are linearly converted may be used.

Next, in step S9, the processor 81 outputs the first BGM sound or the second BGM sound obtained through combination in the above adjustment process, at the final output volume determined above.

Next, in step S10, the processor 81 determines whether or not a condition for ending the game processing has been satisfied. For example, the condition is whether or not a game end instruction operation has been made by the player, or the like. If the condition has not been satisfied (NO in step S10), the processor 81 returns to step S1, and repeats the process. Meanwhile, if the condition has been satisfied (YES in step S10), the processor 81 ends the game processing.

Meanwhile, as a result of the determination in step S3, if the player character 101 has not come into contact with a gate (NO in step S3), the processor 81 determines, in step S6, whether or not the during-change flag 309 is ON. If the during-change flag 309 is ON (YES in step S6), the process is advanced to step S7 described above, and the process of adjusting the stereo component and the monaural component of the BGM while the monaural ratio is gradually changed is performed. Meanwhile, if the during-change flag 309 is OFF, the process in step S7 is skipped, and the process is advanced to step S8. In this case, the process of determining the overall volume on the basis of the monaural ratio data 308 at that time point is performed.

This is the end of detailed description of the game processing according to the exemplary embodiment.

As described above, in the exemplary embodiment, if the player character 101 is in the second area (the area on the far side), control of adjusting the stereo BGM so as to be closer to being monaural, and reproducing the resultant BGM is performed. Therefore, if the player character is on the far side, the BGM whose sense of stereo is weakened can be outputted. As a result, between a case where the player character is in the first area and a case where the player character is in the second area, the way of hearing (the sense of stereo of) the BGM can be made different. As a result, through reproduction of the BGM, the sense of depth of the virtual space can be expressed.

In the exemplary embodiment, just because the player character 101 is on the far side, that is, the player character 101 is far from the virtual camera, the volume of reproduction of the BGM is not decreased in accordance with the distance. Therefore, even if the player character 101 is far away, a situation where it is difficult to hear the BGM because the volume is low does not occur.

Modification

The above exemplary embodiment shows an example in which using the fact that the player character 101 has come into contact with a gate 102 and has moved to the other area, as a trigger, a process of adjusting the sense of stereo of the BGM is performed. In another exemplary embodiment, not limited to using such a trigger, the monaural ratio may be determined on the basis of, for example, the position (depth value) in the depth direction axis of the player character 101 in the virtual space. For example, determination may be made such that the farther the position of the player character 101 is on the far side from the virtual camera, the higher the monaural ratio is made, and the nearer (the player character 101 comes to the near side) the position of the player character 101 is to the virtual camera side, the lower the monaural ratio is made. In this case, a region for which the monaural ratio is determined to be 0% (the stereo ratio is 100%) may be defined as a region corresponding to the first area. In this case, not limited to the game that uses topographically-divided two areas as described above, the above-described processing may be applied to a game in which the player character 101 can move on the depth direction axis on a non-divided topography.

In the above exemplary embodiment, while focusing on the position of the player character 101, adjustment of the sense of stereo of the BGM is performed. Regarding this point, in another exemplary embodiment, while focusing on a change in the position of a character other than the player character 101, adjustment of the sense of stereo of the BGM may be performed. For example, while focusing on a change in the position of a "boss character", the adjustment process of the sense of stereo of the BGM as described above may be performed. As an example, in play at a predetermined stage, until the player character 101 encounters a boss character, an adjustment process of the sense of stereo of the BGM is performed while focusing on the position of the player character 101. After the player character 101 has encountered the boss character (in a so-called boss battle), the BGM is also switched to BGM for the boss battle, and in accordance with positional change on the depth direction axis of the boss character, an adjustment process of the sense of stereo of the BGM for the boss battle may be performed.

Not limited to the characters as above, with respect to a sound source object that is continuously outputting a predetermined sound, the adjustment process of the sense of stereo as described above may be performed on the predetermined sound. If such a sound source object can move on the depth direction axis, the sense of depth of the virtual space can be expressed in association with movement of the sound source object.

In the above exemplary embodiment, a case where a series of processes according to the game processing is executed by a single game apparatus 2 has been described. In another exemplary embodiment, the series of processes above may be executed in an information processing system including a plurality of information processing apparatuses. For example, in an information processing system including a terminal-side apparatus and a server-side apparatus communicable with the terminal-side apparatus via a network, a part of the above processes may be executed by the server-side apparatus. Further, in an information processing system including a terminal-side apparatus and a server-side apparatus communicable with the terminal-side apparatus via a network, a main process out of the series of processes above may be executed by the server-side apparatus and a part of the processes may be executed by the terminal-side apparatus. In the above information processing system, the system on the server side may include a plurality of information processing apparatuses, and a process to be executed on the server side may be divided and executed by the plurality of information processing apparatuses. In addition, a so-called cloud gaming configuration may be adopted. For example, the game apparatus 2 may be configured to send operation data indicating an operation by a player to a predetermined server, and the server may be configured to execute various types of game processing and stream the execution results as video/sound to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. One or more computer-readable non-transitory storage media having stored therein a game program, the game program causing at least one processor of an information processing apparatus to:

control a predetermined character in a virtual space;

in a first scene, output in stereo a first BGM sound based on a stereo sound source for BGM; and in a second scene where the predetermined character is positioned on a far side in the virtual space, output in stereo a second BGM sound according to a sound in which, on the basis of the stereo sound source for BGM, a stereo component is decreased and a monaural component is increased with respect to a sound of the stereo sound source.

2. The one or more computer-readable non-transitory storage media having stored therein the game program according to claim 1, wherein the first scene is a scene where the predetermined character is in a first range on a near side in the virtual space, the second scene is a scene where the predetermined character is in a second range on the far side in the virtual space, and the game program further causes the processor to move the predetermined character to the second range if a first condition has been satisfied in the first scene.

3. The one or more computer-readable non-transitory storage media having stored therein the game program according to claim 2, wherein the game program further causes the processor to move the predetermined character to the first range if a second condition has been satisfied in the second scene.

4. The one or more computer-readable non-transitory storage media having stored therein the game program according to claim 1, wherein the game program causes the processor to determine, in the second scene, on the basis of a depth value of the predetermined character, a degree by which the stereo component is decreased and the monaural component is increased with respect to the sound of the stereo sound source.

5. The one or more computer-readable non-transitory storage media having stored therein the game program according to claim 1, wherein the game program causes the processor to in the second scene, generate the second BGM sound by using: a sound obtained by combining, at a first proportion, a first sound of the stereo sound source for BGM with a second sound of the stereo sound source for BGM; and a sound obtained by combining, at the first proportion, the second sound with the first sound, and output the second BGM sound in stereo.

6. The one or more computer-readable non-transitory storage media having stored therein the game program according to claim 5, wherein the game program further causes the processor to in the second scene, generate the second BGM sound by reducing, at an attenuation rate calculated on the basis of the first proportion, a volume of each of: a sound obtained by adding, at the first proportion, the first sound of the stereo sound source for BGM to the second sound;

and a sound obtained by adding, at the first proportion, the second sound to the first sound.

7. The one or more computer-readable non-transitory storage media having stored therein the game program according to claim 1, wherein the predetermined character is a player character, and the game program causes the processor to control movement of the player character on the basis of an operation input.

8. A game system comprising at least one processor, the processor being configured to:

control a predetermined character in a virtual space;

in a first scene, output in stereo a first BGM sound based on a stereo sound source for BGM; and in a second scene where the predetermined character is positioned on a far side in the virtual space, output in stereo a second BGM sound according to a sound in which, on the basis of the stereo sound source for BGM, a stereo component is decreased and a monaural component is increased with respect to a sound of the stereo sound source.

9. The game system according to claim 8, wherein
the first scene is a scene where the predetermined character is in a first range on a near side in the virtual space,
the second scene is a scene where the predetermined character is in a second range on the far side in the virtual space, and
the processor further
moves the predetermined character to the second range if a first condition has been satisfied in the first scene.

10. The game system according to claim 9, wherein
the processor further
moves the predetermined character to the first range if a second condition has been satisfied in the second scene.

11. The game system according to claim 8, wherein
the processor
determines, in the second scene, on the basis of a depth value of the predetermined character, a degree by which the stereo component is decreased and the monaural component is increased with respect to the sound of the stereo sound source.

12. The game system according to claim 8, wherein
the processor
in the second scene,
generates the second BGM sound by using: a sound obtained by combining, at a first proportion, a first sound of the stereo sound source for BGM with a second sound of the stereo sound source for BGM; and a sound obtained by combining, at the first proportion, the second sound with the first sound, and outputs the second BGM sound in stereo.

13. The game system according to claim 12, wherein
the processor further
in the second scene,
generates the second BGM sound by reducing, at an attenuation rate calculated on the basis of the first proportion, a volume of each of: a sound obtained by adding, at the first proportion, the first sound of the stereo sound source for BGM to the second sound; and a sound obtained by adding, at the first proportion, the second sound to the first sound.

14. The game system according to claim 8, wherein
the predetermined character is a player character, and
the processor controls movement of the player character on the basis of an operation input.

15. A computer-implemented method for causing at least one processor of an information processing apparatus to:
control a predetermined character in a virtual space;
in a first scene, output in stereo a first BGM sound based on a stereo sound source for BGM; and
in a second scene where the predetermined character is positioned on a far side in the virtual space, output in stereo a second BGM sound according to a sound in which, on the basis of the stereo sound source for BGM, a stereo component is decreased and a monaural component is increased with respect to a sound of the stereo sound source.

16. The computer-implemented method according to claim 15, wherein
the first scene is a scene where the predetermined character is in a first range on a near side in the virtual space,
the second scene is a scene where the predetermined character is in a second range on the far side in the virtual space, and
the computer-implemented method further causes the processor to
move the predetermined character to the second range if a first condition has been satisfied in the first scene.

17. The computer-implemented method according to claim 16, wherein
the computer-implemented method further causes the processor to
move the predetermined character to the first range if a second condition has been satisfied in the second scene.

18. The computer-implemented method according to claim 15, wherein
the computer-implemented method causes
the processor to
determine, in the second scene, on the basis of a depth value of the predetermined character, a degree by which the stereo component is decreased and the monaural component is increased with respect to the sound of the stereo sound source.

19. The computer-implemented method according to claim 15, wherein
the computer-implemented method causes the processor to
in the second scene,
generate the second BGM sound by using: a sound obtained by combining, at a first proportion, a first sound of the stereo sound source for BGM with a second sound of the stereo sound source for BGM; and a sound obtained by combining, at the first proportion, the second sound with the first sound, and output the second BGM sound in stereo.

20. The computer-implemented method according to claim 19, wherein
the computer-implemented method further causes the processor to
in the second scene,
generate the second BGM sound by reducing, at an attenuation rate calculated on the basis of the first proportion, a volume of each of: a sound obtained by adding, at the first proportion, the first sound of the stereo sound source for BGM to the second sound; and a sound obtained by adding, at the first proportion, the second sound to the first sound.

21. The computer-implemented method according to claim 15, wherein
the predetermined character is a player character, and
the computer-implemented method causes the processor to control movement of the player character on the basis of an operation input.

22. A game apparatus comprising at least one processor, the processor being configured to:
control a predetermined character in a virtual space;
in a first scene, output in stereo a first BGM sound based on a stereo sound source for BGM; and
in a second scene where the predetermined character is positioned on a far side in the virtual space, output in stereo a second BGM sound according to a sound in which, on the basis of the stereo sound source for BGM, a stereo component is decreased and a monaural component is increased with respect to a sound of the stereo sound source.

23. The game apparatus according to claim 22, wherein the first scene is a scene where the predetermined character is in a first range on a near side in the virtual space, the second scene is a scene where the predetermined character is in a second range on the far side in the virtual space, and the processor further moves the predetermined character to the second range if a first condition has been satisfied in the first scene.

24. The game apparatus according to claim 23, wherein the processor further moves the predetermined character to the first range if a second condition has been satisfied in the second scene.

25. The game apparatus according to claim 22, wherein the processor determines, in the second scene, on the basis of a depth value of the predetermined character, a degree by which the stereo component is decreased and the monaural component is increased with respect to the sound of the stereo sound source.

26. The game apparatus according to claim 22, wherein the processor in the second scene, generates the second BGM sound by using: a sound obtained by combining, at a first proportion, a first sound of the stereo sound source for BGM with a second sound of the stereo sound source for BGM; and a sound obtained by combining, at the first proportion, the second sound with the first sound, and outputs the second BGM sound in stereo.

27. The game apparatus according to claim 26, wherein the processor further in the second scene, generates the second BGM sound by reducing, at an attenuation rate calculated on the basis of the first proportion, a volume of each of: a sound obtained by adding, at the first proportion, the first sound of the stereo sound source for BGM to the second sound; and a sound obtained by adding, at the first proportion, the second sound to the first sound.

28. The game apparatus according to claim 22, wherein the predetermined character is a player character, and the processor controls movement of the player character on the basis of an operation input.

* * * * *